US009310615B2

(12) United States Patent
Allen

(10) Patent No.: US 9,310,615 B2
(45) Date of Patent: Apr. 12, 2016

(54) SUN-BLOCKING AND PRIVACY HOOD

(71) Applicant: Rob Michael Allen, Las Vegas, NV (US)

(72) Inventor: Rob Michael Allen, Las Vegas, NV (US)

(*) Notice: Subject to any disclaimer, the term of this patent is extended or adjusted under 35 U.S.C. 154(b) by 355 days.

(21) Appl. No.: 13/863,227

(22) Filed: Apr. 15, 2013

(65) Prior Publication Data

US 2013/0229715 A1    Sep. 5, 2013

Related U.S. Application Data

(63) Continuation-in-part of application No. 13/002,045, filed as application No. PCT/US2009/049310 on Jun. 30, 2009, now abandoned.

(60) Provisional application No. 61/077,013, filed on Jun. 30, 2008.

(51) Int. Cl.
*G02B 27/04* (2006.01)
*G02B 27/00* (2006.01)
*G06F 1/16* (2006.01)

(52) U.S. Cl.
CPC ............ *G02B 27/04* (2013.01); *G02B 27/0018* (2013.01); *G06F 1/1603* (2013.01); *G06F 2200/1612* (2013.01)

(58) Field of Classification Search
CPC .......... G06F 1/1603; G06F 2200/1613; G02B 27/00; G02B 27/04; G02B 27/0018
See application file for complete search history.

(56) References Cited

U.S. PATENT DOCUMENTS

| | | | | |
|---|---|---|---|---|
| 3,849,598 A | * | 11/1974 | Hoffberger et al. | 348/842 |
| 4,314,280 A | * | 2/1982 | Rose | 348/842 |
| 4,569,572 A | * | 2/1986 | Kopich | 359/601 |
| 5,877,896 A | * | 3/1999 | Gremban | 359/601 |
| 5,905,546 A | * | 5/1999 | Giulie et al. | 348/842 |
| 5,988,823 A | * | 11/1999 | Wong | 359/601 |
| 6,144,419 A | * | 11/2000 | Schmidt | 348/842 |
| 6,302,546 B1 | * | 10/2001 | Kordiak | 359/608 |
| 2003/0223119 A1 | * | 12/2003 | Heiman | 359/610 |
| 2005/0007778 A1 | * | 1/2005 | Lin | 362/250 |
| 2006/0279916 A1 | * | 12/2006 | Boudreau | 361/681 |

* cited by examiner

*Primary Examiner* — Derek S Chapel

(74) *Attorney, Agent, or Firm* — Armstrong Teasdale LLP

(57) ABSTRACT

Described is a sun-blocking hood for an electronic device in which the hood or shade includes a left, right, top, and back panel that may be various configured so as to fully collapse the hood or fully construct the hood so as to provide privacy and shading to the display of an electronic device. The hood is height adjustable, via side extenders that are attached to the top panel and that overlap the left or right panels. In the collapsed position, the hood may be attached to the electronic device so as to provide protection to the outside of the electronic device.

13 Claims, 16 Drawing Sheets

SUN-BLOCKING AND PRIVACY HOOD

PRIORITY/CROSS-REFERENCE TO RELATED APPLICATIONS

This application is a continuation-in-part of application Ser. No. 13/002,045, filed on Dec. 12, 2010, which is the National Stage of International Application No. PCT/US2009/049310, filed Jun. 30, 2009, which claims priority to U.S. Application No. 61/077,013 filed on Jun. 30, 2008.

TECHNICAL FIELD

The invention generally relates to a device for decreasing unwanted glare on an electronic device's display, and more particularly to a fully collapsible, fully adjustable, and fully removable device for providing shading and privacy to the display of an electronic device.

BACKGROUND ART

Oftentimes, using an electronic device having a traditional display in a setting with natural light is difficult due to unwanted glare on the display, which makes the display difficult to see. Prior attempts to decrease the unwanted glare on electronic devices, such as laptops and computer monitors, include contraptions designed to fit around a display leaving some amount of opening for viewing of the display. For example, the device providing privacy and shade for a display described in U.S. Published patent application Ser. No. 11/450,592, Publication No. US 2006/0279916, describes a box-like device that is fitted around the display and keyboard of a laptop or other electronic device. The device is designed to be attached to the electronic device, for example, by attaching either a hook or loop component to the display's housing with a corresponding loop or hook component being located on the box-like device. However, the box-like device provides for little height adjustment, and does not provide for easy transportation or added protection to the electronic device, itself.

DISCLOSURE OF INVENTION

Described is a sun-blocking hood for an electronic device that can be fully collapsed while still mounted onto the electronic device, can be fully unfolded and constructed while still mounted to the electronic device, and provides for significant height adjustment. In addition, the hood does not require attachment of anything permanently to the electronic device. Accordingly, this sun-blocking hood, or shade, provides for easy transportation of the hood with the electronic device, a wide range of privacy and shade provision while not requiring any adjustment to the electronic device itself. Further, because the shade may be fully collapsed while still attached to the electronic device, the shade also acts as a cushion or protector to the outside of the electronic device, particularly during transport.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

MODES FOR CARRYING OUT THE INVENTION

Figure 1:
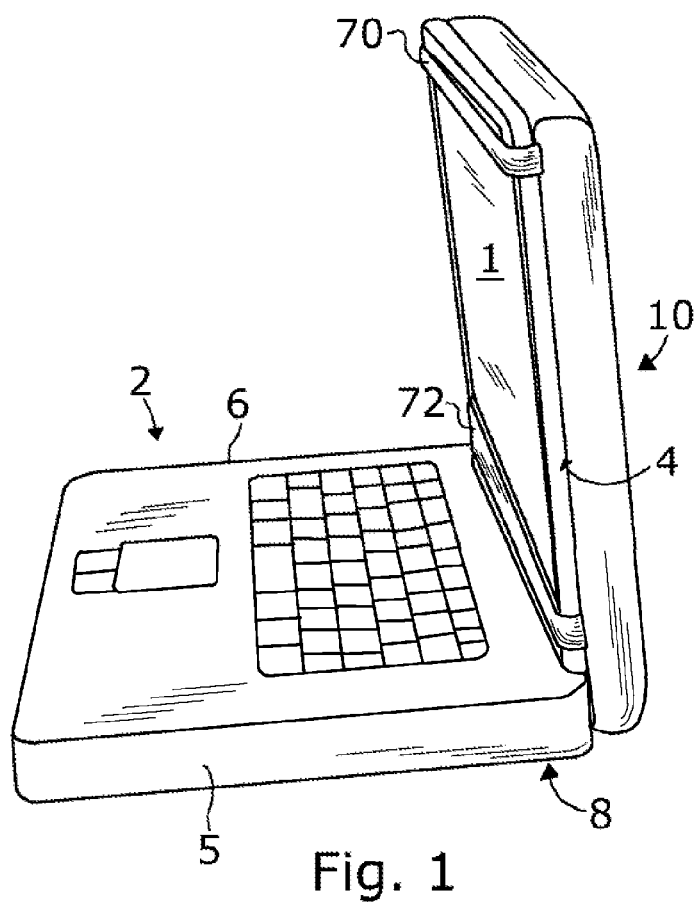
FIG. 1 is a right side, perspective view of a sun-blocking hood in a first configuration, i.e., fully collapsed, attached to an open electronic device, according to a first embodiment.

While the sun-blocking hood is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

In the following description and in the figures, like elements are identified with like reference numerals. The use of "or" indicates a non-exclusive alternative without limitation unless otherwise noted. The use of "including" means "including, but not limited to," unless otherwise noted.

As shown in FIGS. 1 through 27, the sun-blocking hood is embodied in a shade 10 that includes a back panel 12, a left panel 20, a right panel 30, and a top panel 40. The shade 10 is capable of being positioned in a variety of configurations, including configurations in which the shade 10 is fully collapsed (FIGS. 1 through 4), partly unfolded (FIGS. 5 and 6), fully unfolded (FIGS. 7 through 9), half-folded (FIGS. 10 through 12), partly constructed (FIG. 13), completely constructed with no height increase (FIGS. 14 through 19), and completely constructed with height increase (FIGS. 20 through 27). When partly or fully constructed, the shade 10 provides a degree of shading to the display 1 of an electronic device 2 so as to lessen undesirable glare on the display 1. Further, in certain configurations, the shade 10 also provides a degree of privacy to the user of the electronic device 10 in that the shade 10 will at least partially block visibility of the electronic device's 10 display 1 and keyboard. When fully constructed, as shown in FIGS. 14 through 27, the shade 10 provides shading and view-blocking for the electronic device 2 from the back, top, right, and left of the device.

Figure 9:
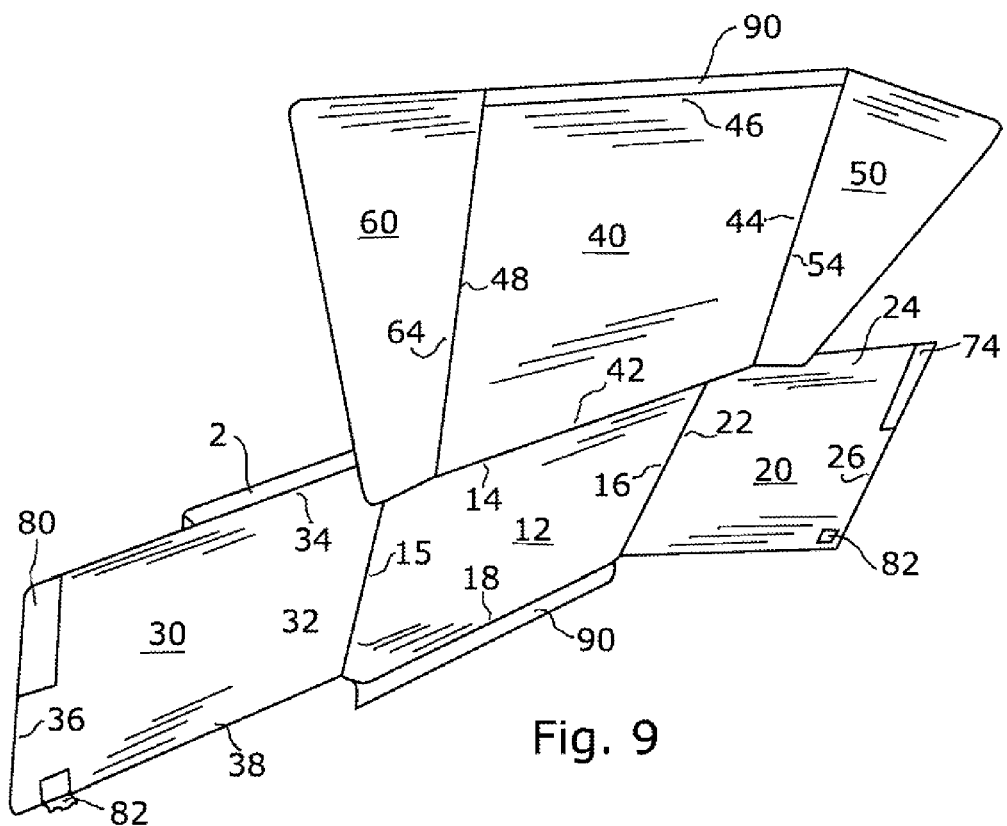
FIG. 9 is a back side, perspective view of a sun-blocking hood in the fourth configuration, i.e., completely unfolded, and attached to an open electronic device, according to the first embodiment.

As shown in FIG. 9, the back panel 12 has a top edge 14, a right edge 15, a left edge 16, and a bottom edge 18. The left panel 20 similarly has a back edge 22, a top edge 24, a front edge 26, and a bottom edge 28. Likewise, the right panel 30 has a back edge 32, a top edge 34, a front edge 36, and a bottom edge 38. Finally, the top panel 40 has a back edge 42, a left edge 44, a front edge 46, and a right edge 48. The back panel 12 is joined to the left panel 20 via connection of the back panel's left edge 16 to the left panel's back edge 22. The back panel 12 is joined to the right panel 30 via connection of the back panel's right edge 15 to the right panel's back edge 32. The back panel 12 is joined to the top panel 40 via connection of the back panel's top edge 14 to the top panel's back edge 42.

The shade 10 further includes a first side extender 50 and a second side extender 60. The first side extender 50 is connected to the left panel 20 via connection of the first side extender's top edge 54 to the left panel's top edge 24. Similarly, the second side extender 60 is connected to the right panel 30 via connection of the second side extender's top edge 64 to the right panel's top edge 34.

Preferably, each of the panels 12, 20, 30, 40 and the first and second side extenders 50, 60 is made of a removable, washable fabric or material that is flexible. Accordingly the panels 12, 20, 30, 40 are joined to one another or to the first or second side extender 50, 60, as described, via seams that allow the panels 12, 20, 30, 40 or side extenders 50, 60 to be moved relative to one another in the same manner as a connecting hinge between the panels 12, 20, 30, 40 or side extenders 50, 60 would allow. According to a second embodiment, shown in FIG. 15, actual hinges 86 are used to connect the panels 12, 20, 30, 40 and first and second side extenders 50, 60.

Figure 2:
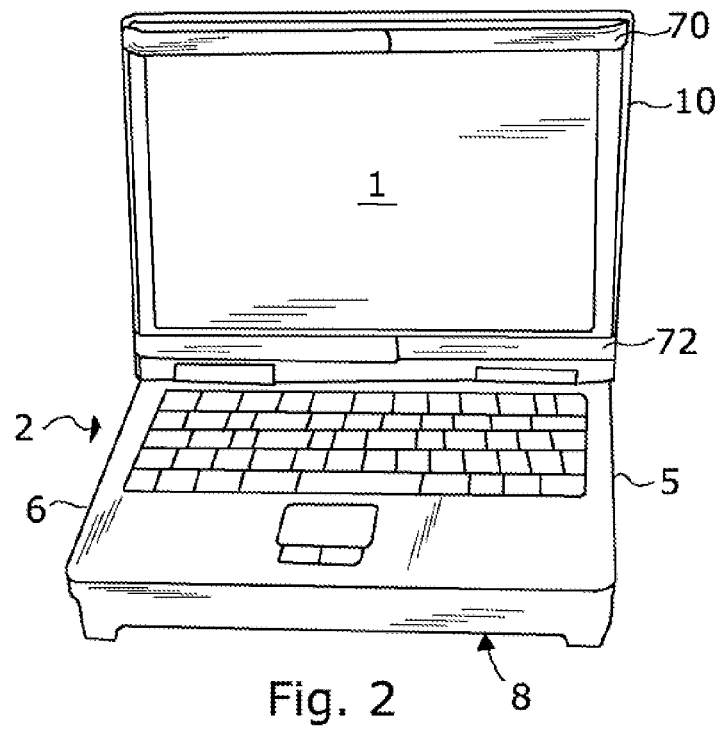
FIG. 2 is a front side, perspective view of a sun-blocking hood in a first configuration, i.e., fully collapsed, attached to an open electronic device, according to the first embodiment.

The shade 10 is preferably configured so that it may be removably attached to an electronic device 2, such as a laptop computer, desktop computer, portable gaming system, automated teller machine, or mobile phone. According to the preferred embodiment, shown in FIG. 2, the shade 10 is attached to the display-containing portion of a laptop via use of two straps with hook and loop attachments. These straps comprise an upper attachment mechanism 70 and a lower attachment mechanism 72. Each mechanism 70, 72 is fixedly attached to the back panel 12 of the shade 10. The mechanisms 70, 72 may then be selectively engaged to pass over or around the electronic device 2 so as to hold the shade 10 to the electronic device 2 without the need to permanently attach anything to the device 2 itself. Preferably, the upper and lower attachment mechanisms 70, 72 comprise adjustable straps, as shown in FIG. 2, that either strap horizontally over the upper and lower portions of the display area 1 of the electronic device 2 or elastic bands that pass over the electronic device 2 in the same way. According to a third embodiment, shown in FIG. 16, angled straps or elastic bands may be used as the upper and lower attachment mechanisms 70, 72 to attach the shade 10 to the electronic device 2. Using angled straps or elastic bands will accommodate use of laptops or other electronic devices 2 that include built-in web cameras in the top center of the display area 1. According to a fourth embodiment, shown in FIG. 26, angled straps or elastic bands are used as the upper attachment mechanisms 70, while a horizontal strap or elastic band is used as the lower attachment mechanism 72. The number of straps or bands engaged or used to attach the shade 10 to the electronic device 2 need be only so many as is necessary to hold the shade 10 to the electronic device 2, or more straps and bands so as to ensure a stronger hold of the shade 10 to the electronic device 2.

The shade 10 is configured to be alternatively arranged in various configurations, including a first configuration in which the shade is completely collapsed, as shown in FIGS. 1 through 4. In this first configuration, the back panel 12 may be attached to the electronic device 2 via the upper attachment mechanism 70 and the lower attachment mechanism 72. Further, the left panel 20 and the right panel 30 are folded in behind the back panel 12 and the first side extender 50 and second side extender 60 are folded in behind the top panel 40, which lays, then, on top of the others when the fully collapsed shade 10 is in place on an electronic device 2. In this configuration, the collapsed shade 10 provides some protection to the back 4 or the outside of the electronic device 2.

In other embodiments, the shade 10 may be configured so that the back panel 12, left panel 20, and right panel 30 are collapsed against the back 4 of the electronic device, while the top panel 40, first side extender 50, and second side extender 60 are collapsed against the bottom 8 of the electronic device 2, so as to provide protection or padding to the top and bottom of the electronic device 2. In certain of these embodiments, when fully collapsed, the back panel 12 and top panel 40 can be joined along the sides so as to fully enclose the electronic device 2 within the collapsed shade 10. Accordingly, the shade 10 then acts as a protective sleeve to the electronic device 2.

According to the first embodiment, as shown in FIG. 2, when the shade 10 is in the fully collapsed configuration, the electronic device 2 may be utilized in the usual manner. The shade 10 need not be removed from the electronic device 2 in order to be fully collapsed or in order to use the electronic device 2 when shade is not desirable.

Figure 3:
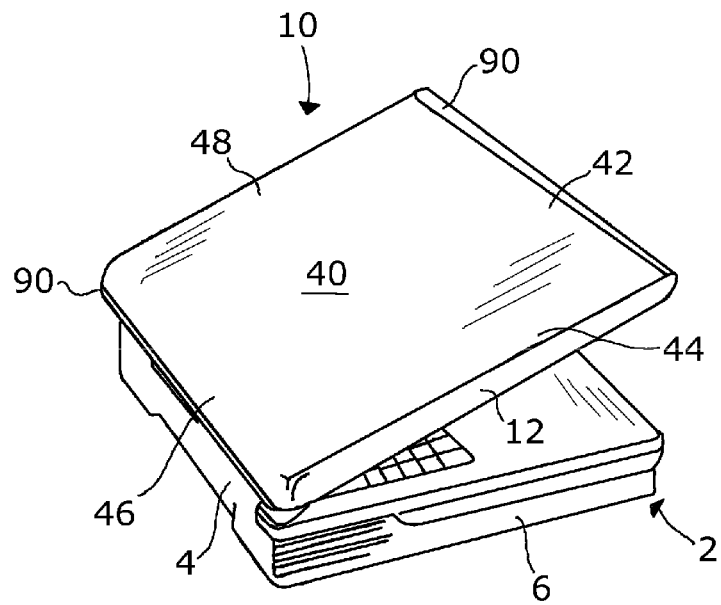
FIG. 3 is a left side, perspective view of a sun-blocking hood in a first configuration, i.e., fully collapsed, attached to a partially open electronic device, according to the first embodiment.

To unfold the shade 10 so as to transition it into the fully-constructed configuration, the electronic device 2 may be closed (if the shade 10 is already attached thereto). A collapsed shade 10 already attached to an almost-closed electronic device 2 is shown in FIG. 3. Once the electronic device 2 is closed, the edge attachment mechanisms 90 along the top panel's front edge 46 and top panel's back edge 42 may be readily accessed. This edge attachment mechanisms 90 are preferably hook and loop arrangements that are configured to accommodate connection of the top panel's front edge 46 to the back panel's bottom edge 18 and connection of the top panel's back edge 42 to the back panel's top edge 14. In this way, the edge attachment mechanisms 90 are helpful in keeping the shade 10 in the fully collapsed configuration shown in FIG. 3.

Figure 4:
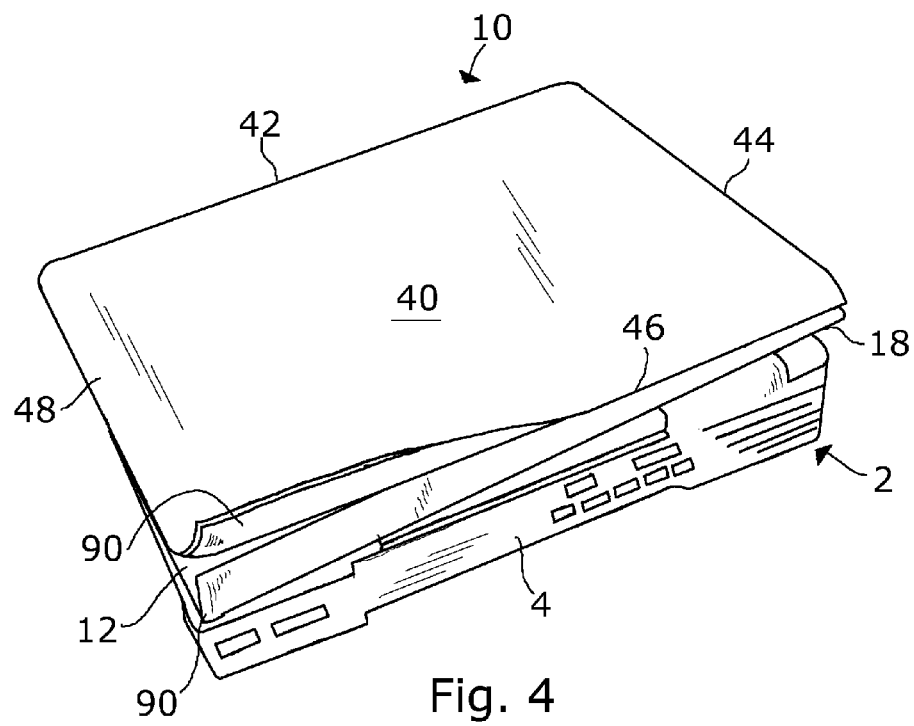
FIG. 4 is a back side, perspective view of a sun-blocking hood in a first configuration, i.e., fully collapsed, attached to a closed electronic device, according to the first embodiment.
Figure 5:
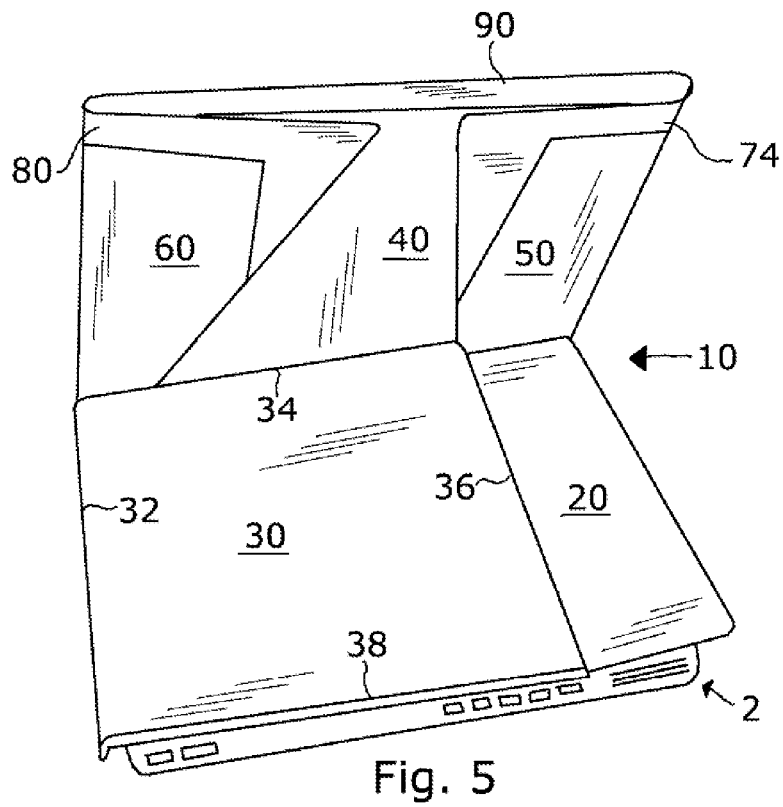
FIG. 5 is a back side, perspective view of a sun-blocking hood in a second configuration, i.e., partly unfolded, and attached to a closed electronic device, according to the first embodiment.

As shown in FIG. 4, the edge attachment mechanisms 90 may be opened or separated, as the case may be, so that the shade 10 may be unfolded. Detaching the edge attachment mechanism 90 at the top panel's front edge 46 from the edge attachment mechanism 90 at the back panel's bottom edge 18, the top panel 40 may be moved away from the back panel 12, as shown in FIG. 5. In doing so, the first side extender 50 and the second side extender 60 move away from the back panel 12, while the left panel 20 and right panel 30 remain laying behind the back panel 12.

Figure 6:
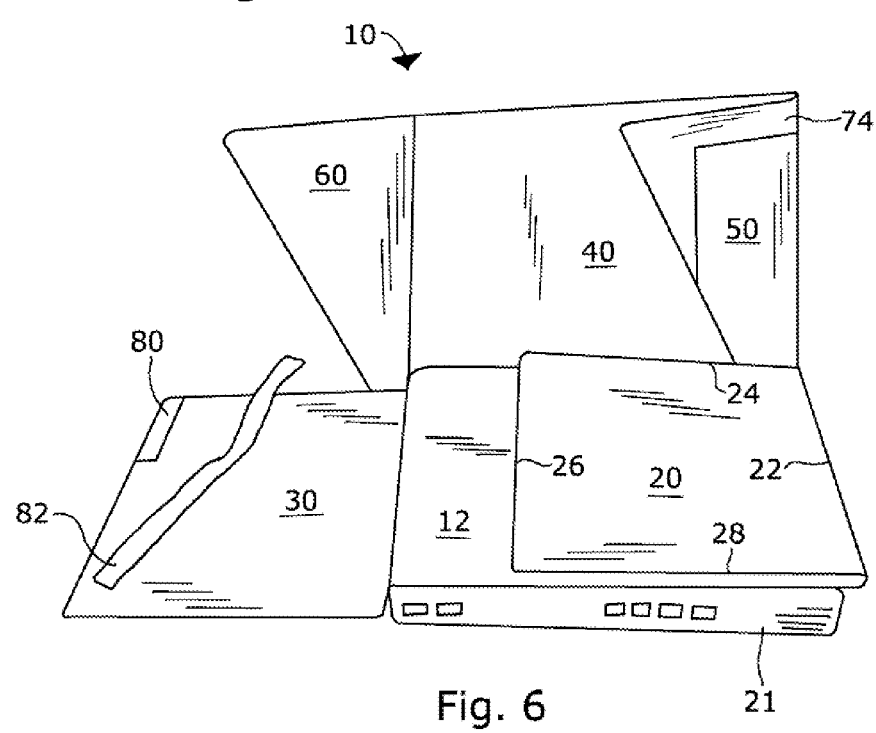
FIG. 6 is a back side, perspective view of a sun-blocking hood in a third configuration, i.e., more unfolded than in the second configuration, attached to a closed electronic device, according to the first embodiment.

Once the top panel 40 is moved away from the back panel 12, each of the side extenders 50, 60 may be moved away from the top panel 40 so that they lay next to the top panel 40 while each of the left panel 20 and right panel 30 may be moved away from the back panel 12 so that they lay next to the back panel 12. As shown in FIG. 6, the shade 10 is in the third configuration in which it is partially unfolded. More specifically, the second side extender 60 has been moved away from the top panel 40 and is laying there beside while the right panel 30 has been moved away from the back panel 12 and is laying there beside. Of course, which of the first side extender 50 and second side extender 60 is first moved away from the top panel 40 or whether they are simultaneously moved away from the top panel 40 is a matter of discretion. The same is true with regard to the left panel 20 and the right panel 30 and their movement away from the back panel 12.

Figure 7:
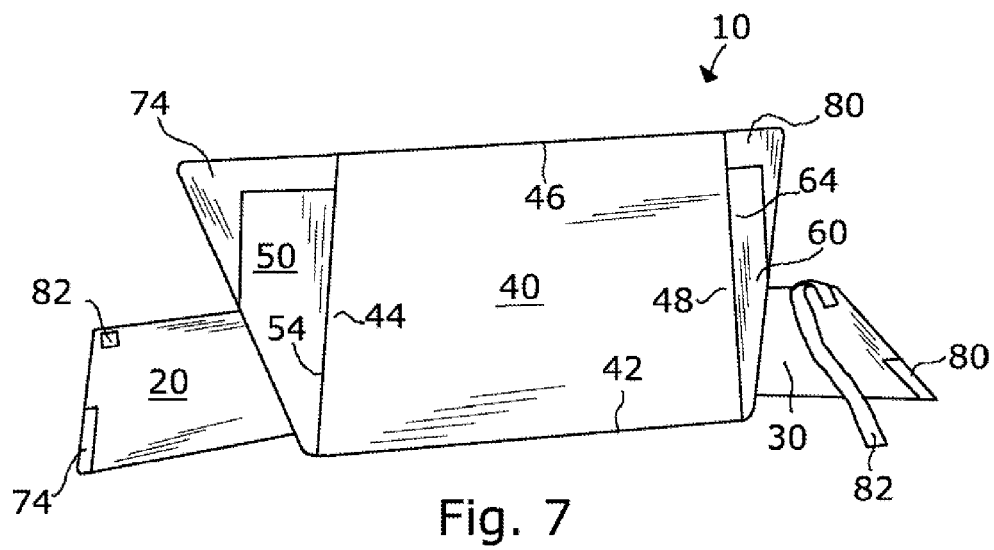
FIG. 7 is a front side, perspective view of a sun-blocking hood in a fourth configuration, i.e., completely unfolded, attached to a closed electronic device, according to the first embodiment.
Figure 8:
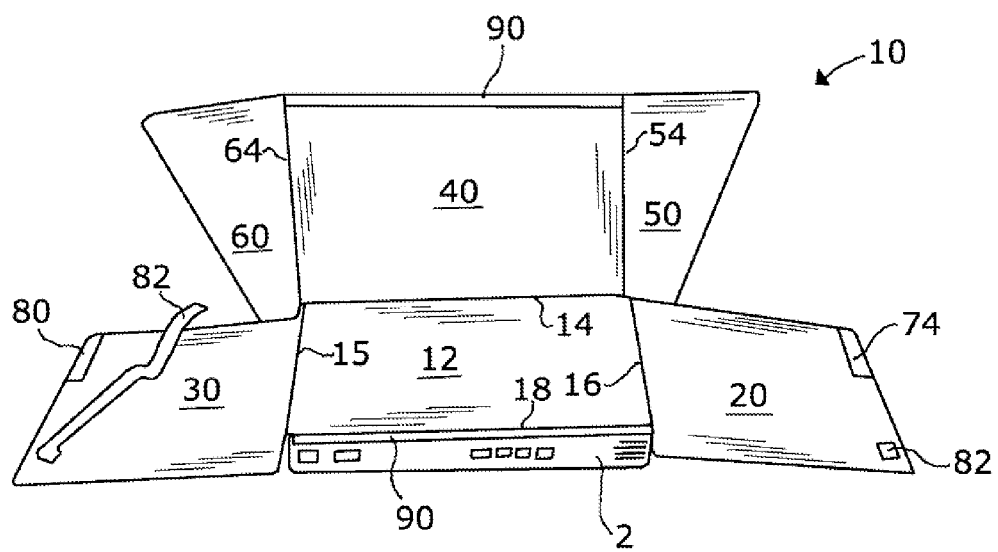
FIG. 8 is a back side, perspective view of a sun-blocking hood in the fourth configuration, i.e., completely unfolded, and attached to a closed electronic device, according to the first embodiment.

Once both of the first side extender 50 and the second side extender 60 have been moved away from the top panel 40 so as to lay there beside and once both the left panel 20 and the right panel 30 have been moved away from the back panel 12 so that they lay there beside, the shade 10 is in a fourth configuration in which the shade 10 is fully unfolded, as shown in FIGS. 7 through 9. In this fully unfolded configuration, the electronic device 2 may be opened, as shown in FIG. 9, so that the shade 10 is in a position to be moved into a constructed configuration.

Figure 10:
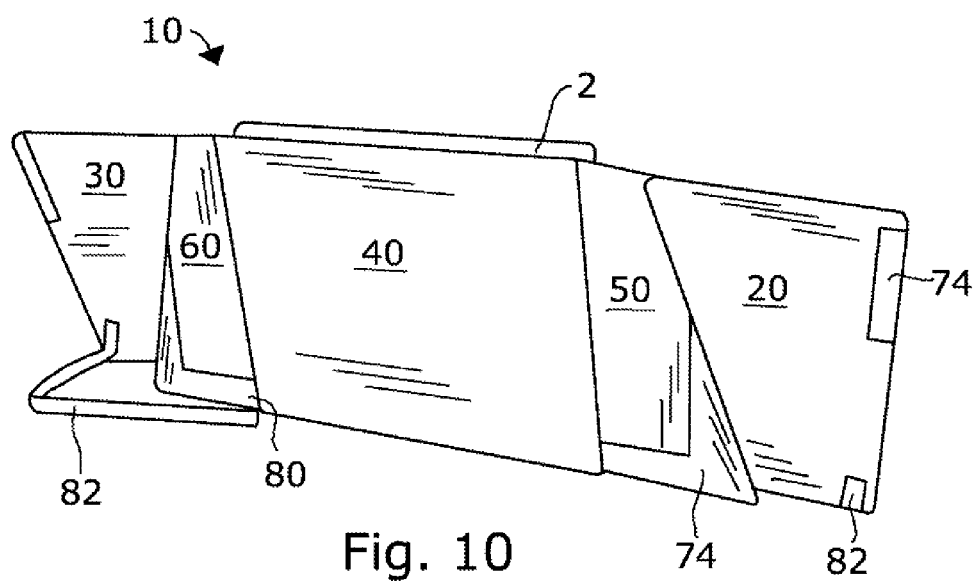
FIG. 10 is a back side, perspective view of a sun-blocking hood in a fifth configuration, i.e., with the top panel folded behind the back panel, attached to an open electronic device, according to the first embodiment.
Figure 11:
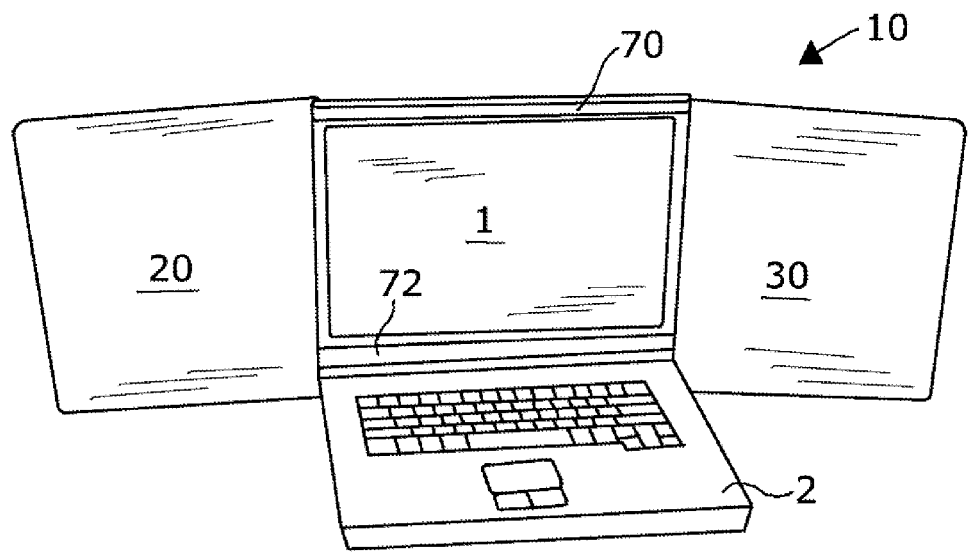
FIG. 11 is a front side, perspective view of a sun-blocking hood in the fifth configuration, i.e., with the top panel folded behind the back panel, attached to an open electronic device, according to the first embodiment.
Figure 12:
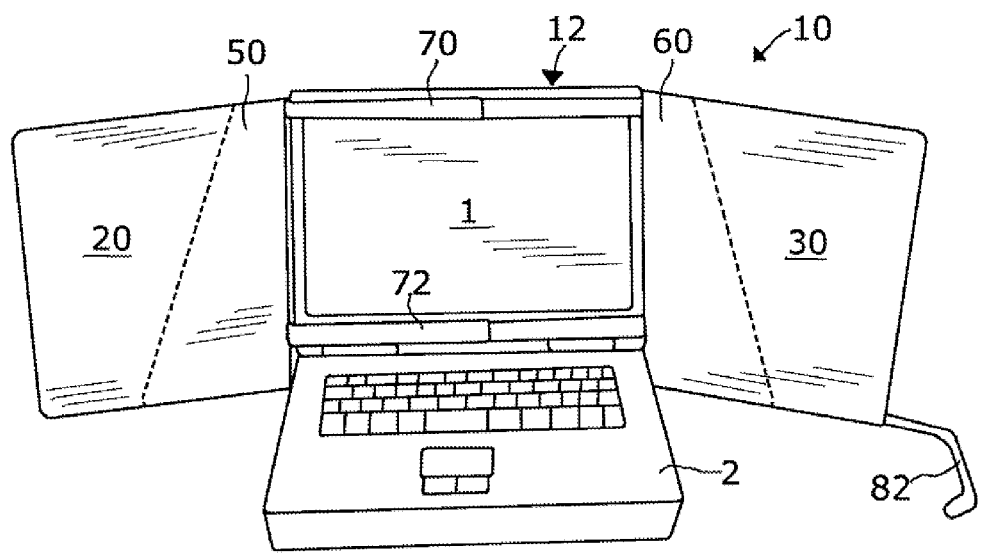
FIG. 12 is a front side, perspective view of a sun-blocking hood in the fifth configuration, i.e., with the top panel folded behind the back panel, attached to an open electronic device, according to the first embodiment.

As shown in FIGS. 10 through 12, the shade 10 may also be configured such that the top panel 40 lays behind the back panel 12 while the first side extender 50, second side extender 60, left panel 20, and right panel 30 are unfolded. In this configuration, the shade 10 provides some light-blocking and some privacy from the back-side direction.

Figure 13:
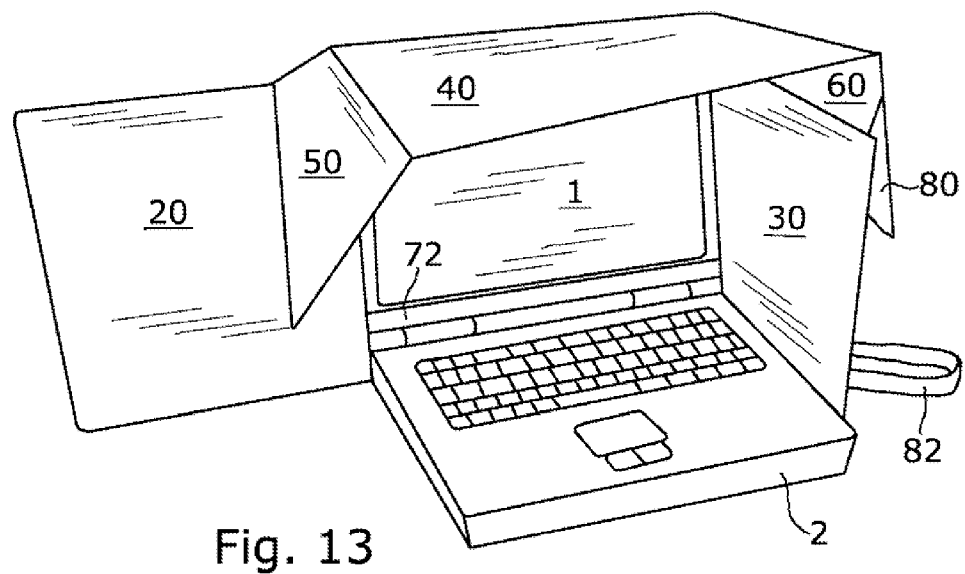
FIG. 13 is a front side, perspective view of a sun-blocking hood in a sixth configuration, i.e., partly constructed but with one panel unfolded, attached to an open electronic device, according to the first embodiment.
Figure 14:
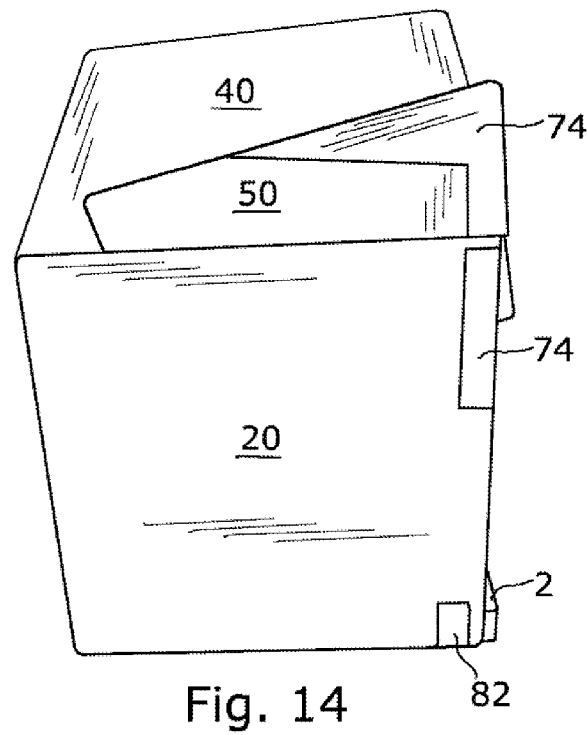
FIG. 14 is a left side, perspective view of a sun-blocking hood essentially in a seventh configuration, i.e., fully constructed with no height extension, attached to an open electronic device, according to the first embodiment, but, as shown, one extender is lifted.
Figure 15:
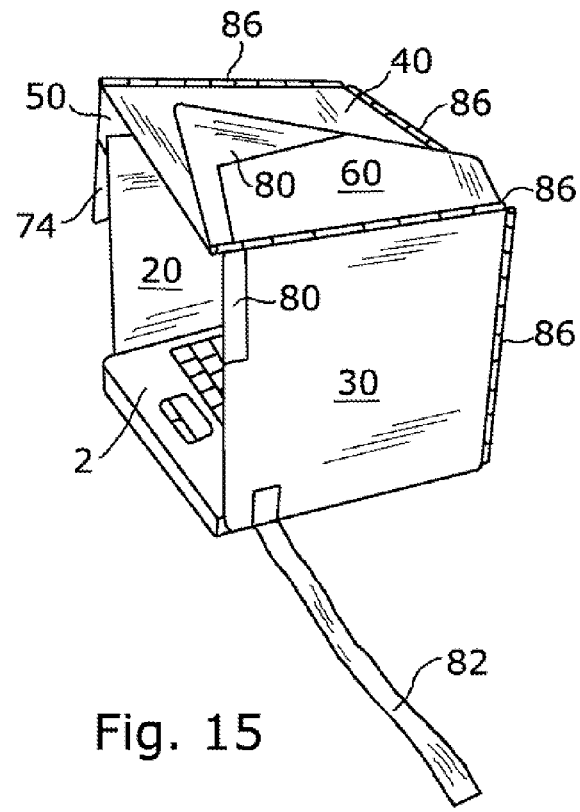
FIG. 15 is a right side, perspective view of a sun-blocking hood essentially in the seventh configuration, i.e., fully constructed with no height extension, attached to an open electronic device, according to a second embodiment, but, as shown, one extender is lifted.
Figure 16:
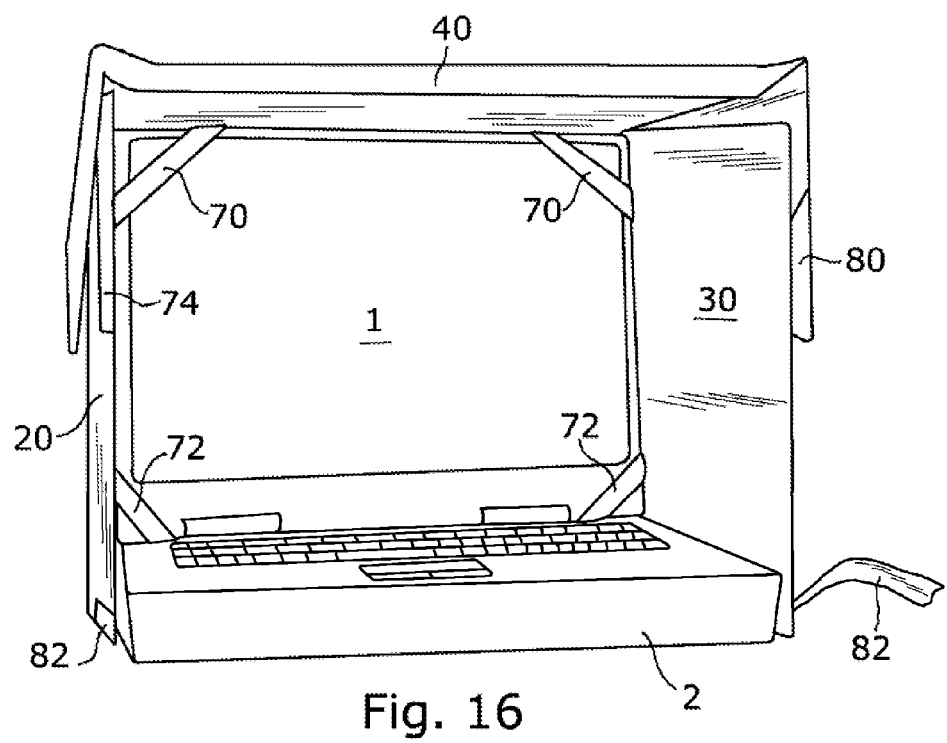
FIG. 16 is a front side, perspective view of a sun-blocking hood in the seventh configuration, i.e., fully constructed with no height extension, attached to an open electronic device, according to a third embodiment.
Figure 17:
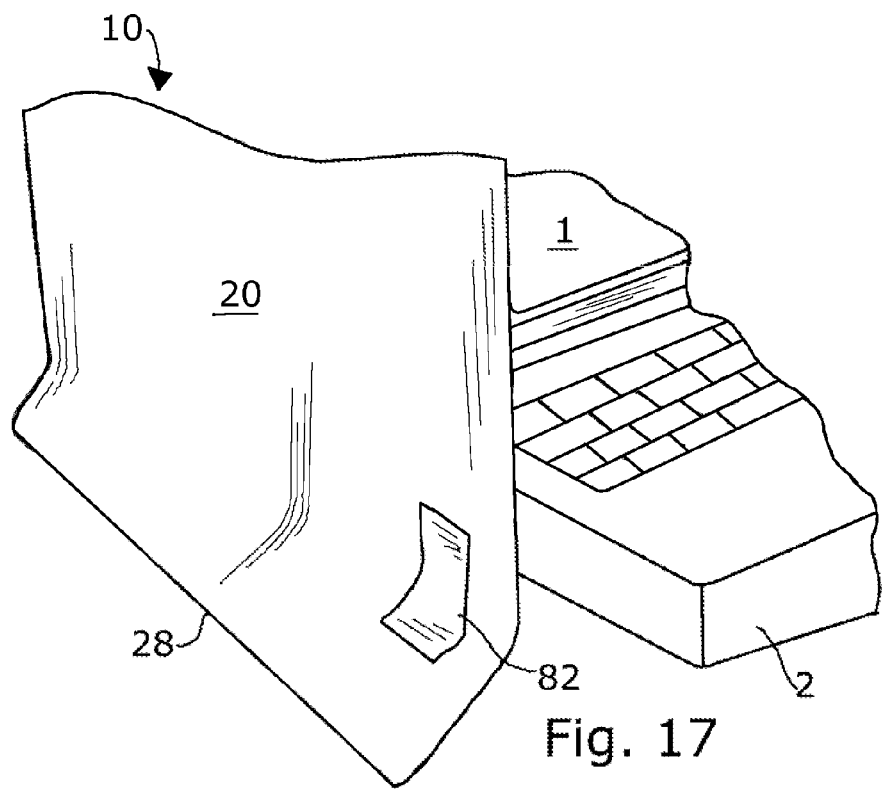
FIG. 17 is a partial, left side, perspective view of the left panel of a sun-blocking hood in the seventh configuration, i.e., fully constructed with no height extension, attached to an open electronic device, according to the first embodiment.
Figure 18:
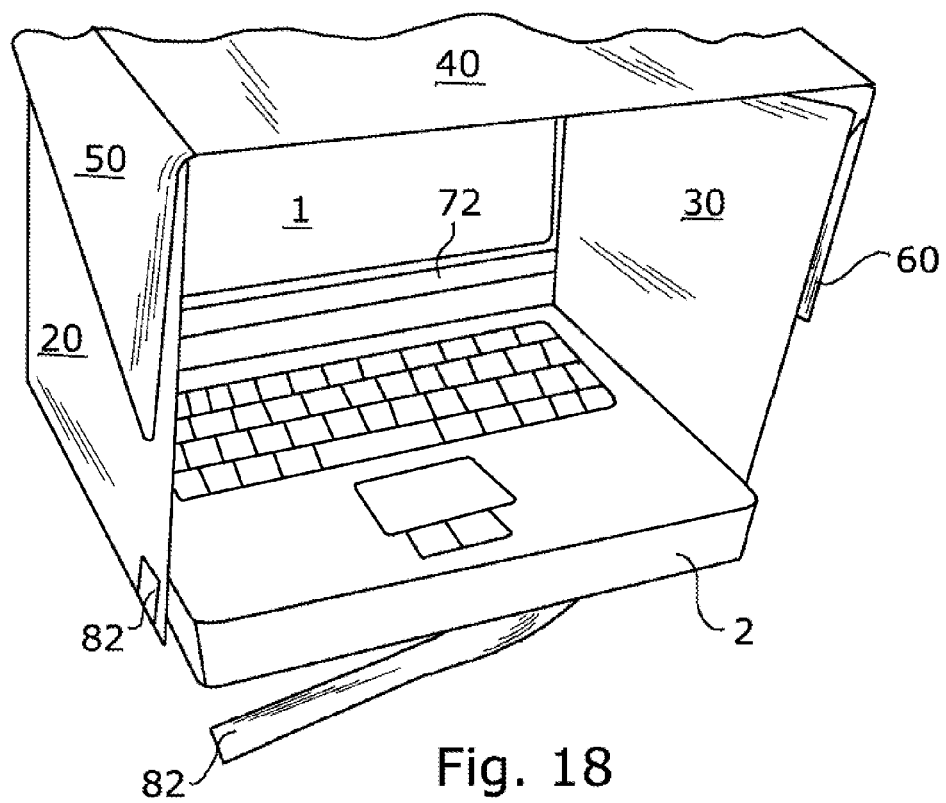
FIG. 18 is a partial, front side, perspective view of a sun-blocking hood in the seventh configuration, i.e., fully constructed with no height extension, attached to an open electronic device, according to the first embodiment.
Figure 19:
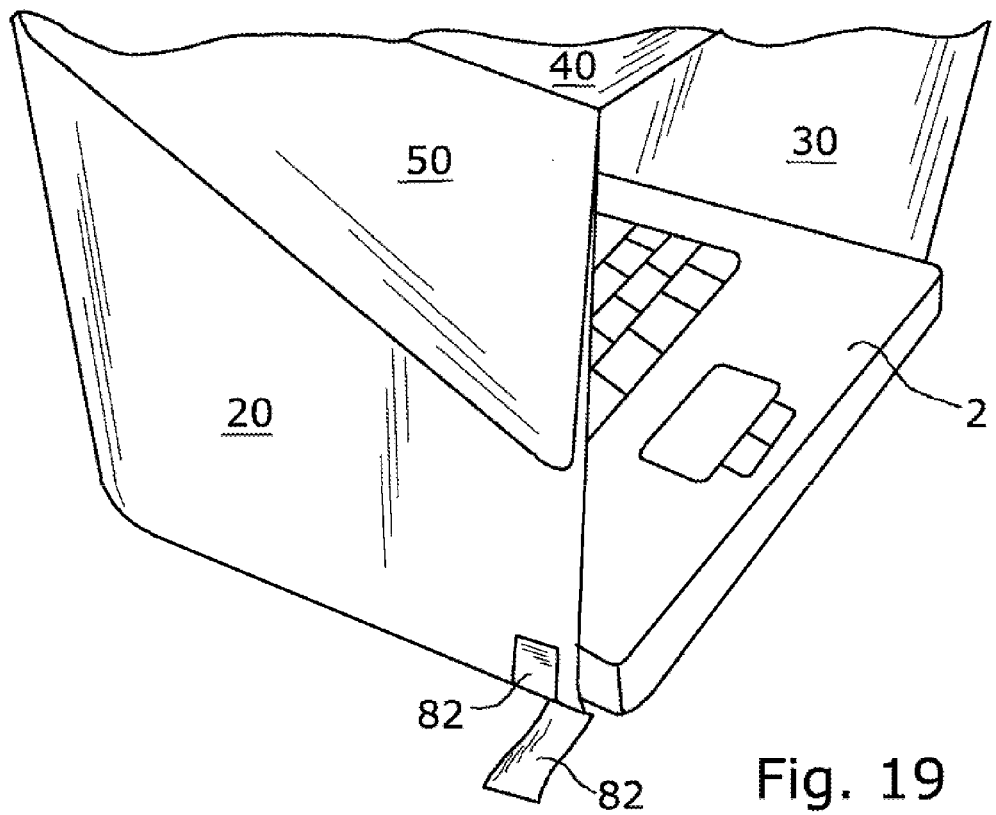
FIG. 19 is a partial, left side, perspective view of a sun-blocking hood in the seventh configuration, i.e., fully constructed with no height extension, attached to an open electronic device, according to the first embodiment.
Figure 20:
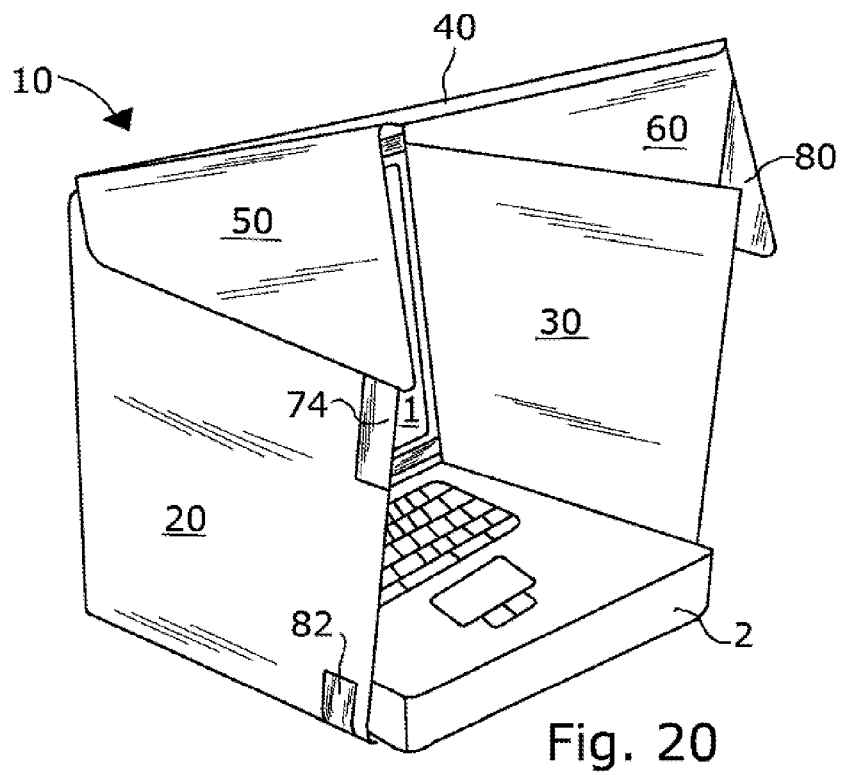
FIG. 20 is a left side, perspective view of a sun-blocking hood in an eight configuration, i.e., fully constructed with height extension, attached to an open electronic device, according to the first embodiment.
Figure 21:
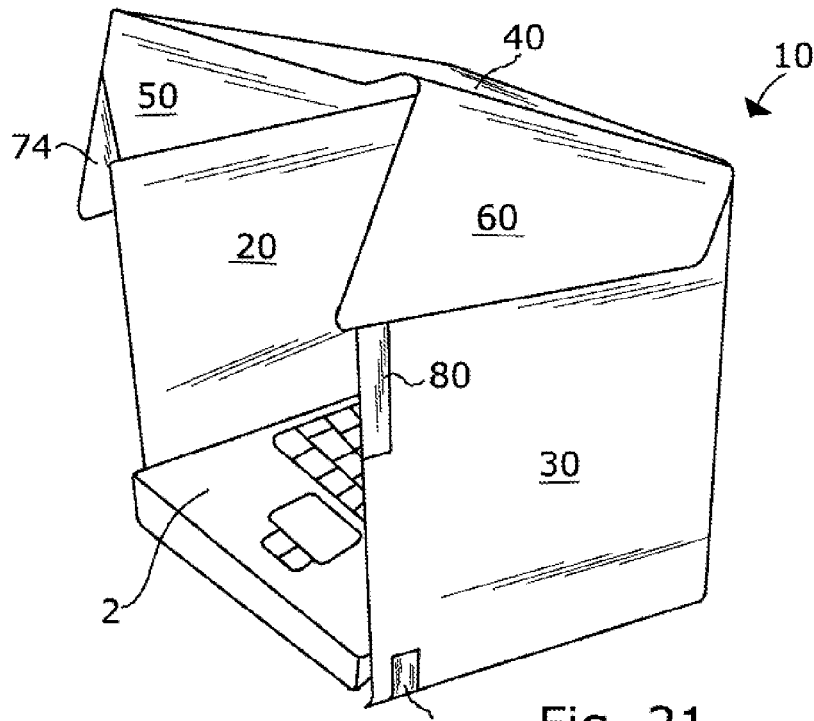
FIG. 21 is a right side, perspective view of a sun-blocking hood in the eighth configuration, i.e., fully constructed with height extension, attached to an open electronic device, according to the first embodiment.
Figure 22:
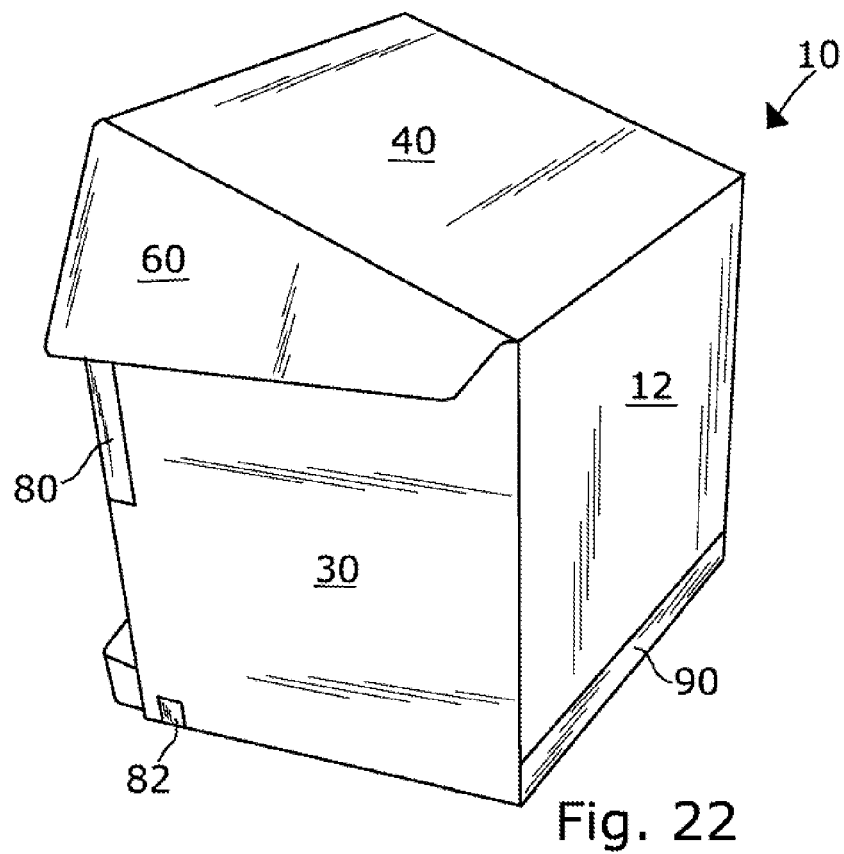
FIG. 22 is a right and back sides, perspective view of a sun-blocking hood in the eighth configuration, i.e., fully constructed with height extension, attached to an open electronic device, according to the first embodiment.
Figure 23:
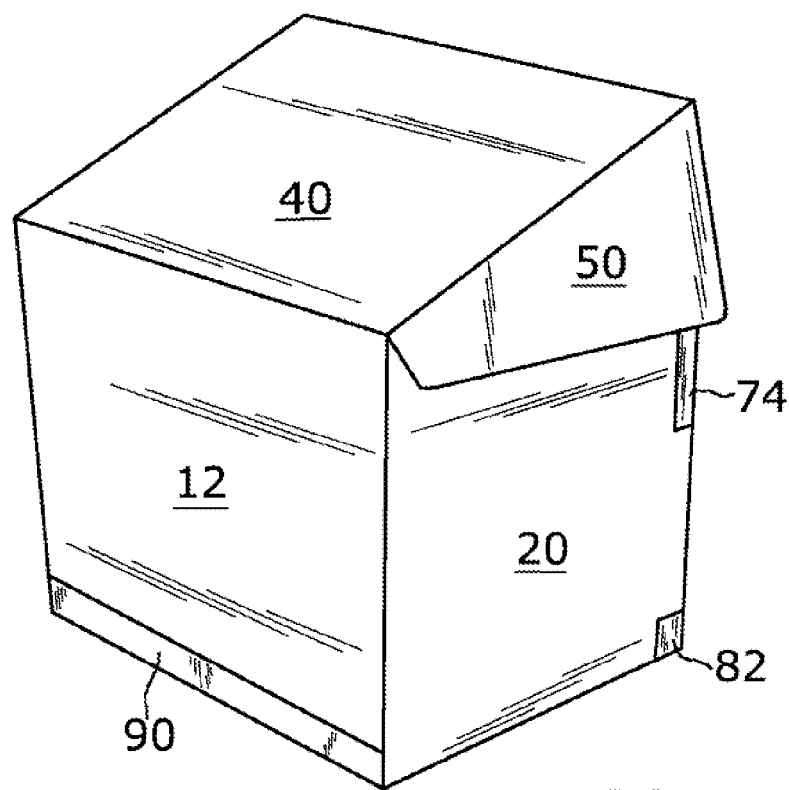
FIG. 23 is a left and back side, perspective view of a sun-blocking hood in the eighth configuration, i.e., fully constructed with height extension, attached to an open electronic device, according to the first embodiment.
Figure 24:
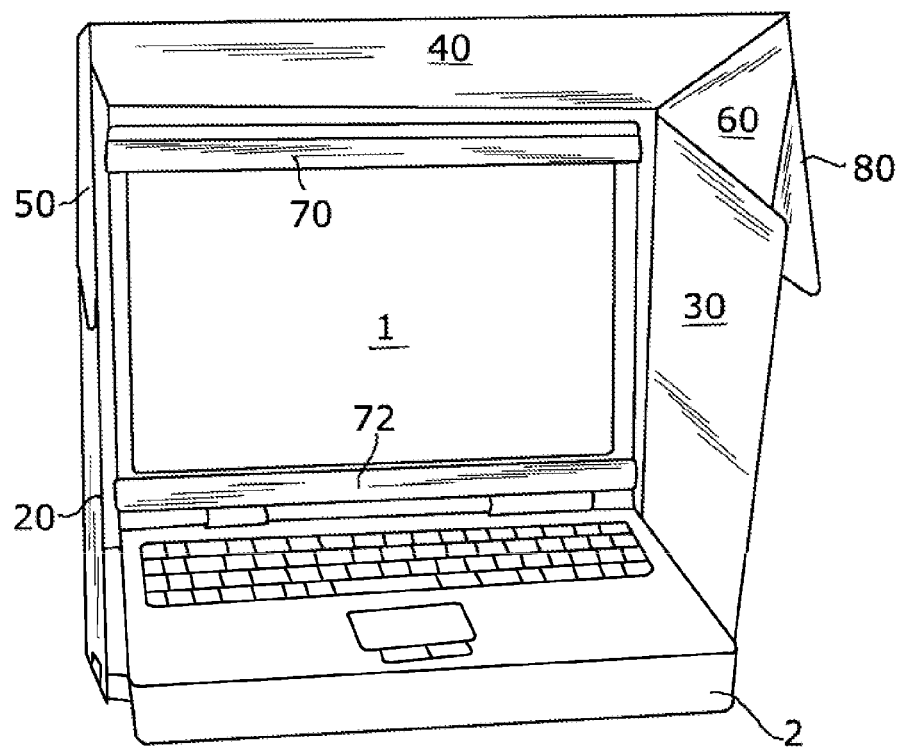
FIG. 24 is a front side, perspective view of a sun-blocking hood in the eighth configuration, i.e., fully constructed with height extension, attached to an open electronic device, according to the first embodiment.
Figure 25:
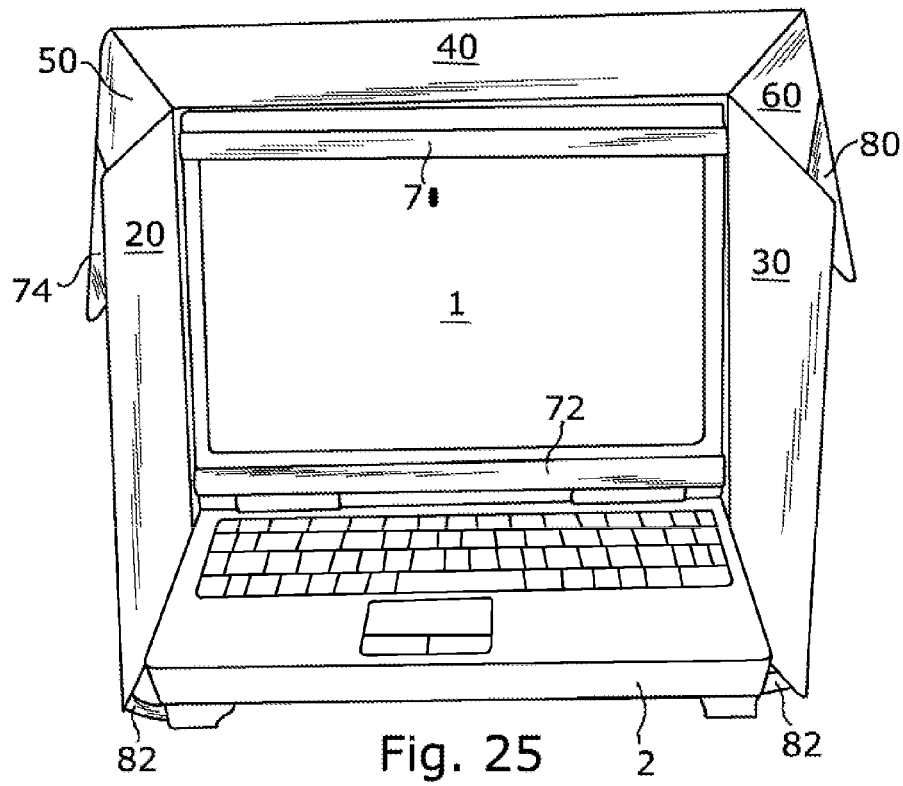
FIG. 25 is a front side, perspective view of a sun-blocking hood in the eighth configuration, i.e., fully constructed with height extension, attached to an open electronic device, according to the first embodiment.

As shown in FIG. 13, the shade 10 may be moved into a sixth configuration in which the shade 10 is partially constructed. In this configuration, one of the side extenders 50, 60 is removably attached to one of the left or right panels 20, 30. In particular, the left panel 20 includes a left attachment mechanism 74 and the right panel 30 includes a right attachment mechanism 80, as shown in FIGS. 14 and 15. Preferably, the left and right attachment mechanisms 74, 80 comprise hook and loop attachment systems in which either the hook or loop side is attached to the left panel 20 and right panel 30 with the corresponding loop or hook side attached to the first side extender 50 and to the second side extender 60. Thus, when the first side extender 50 is brought into contact with the left panel 20 such that the first side extender 50 overlaps at least a portion of the left panel 20, including the left panel's top edge 24, the first side extender 50 will remain there until selectively separated from the left panel 20 and relocated relative to the left panel 20. Similarly, when the second side extender 60 is brought into contact with the right panel 30 such that the section side extender 60 overlaps at least a portion of the right panel 30, including the right panel's top edge 34, the second side extender 60 will remain there until selectively separated from the right panel 30 and relocated relative to the right panel 30.

In this way, the first side extender 50 and second side extender 60 can be attached to the left side panel 20 and right side panel 30, respectively, so that the shade 10 is in a seventh configuration in which the shade 10 is fully constructed and the top panel's left edge 44 meets with the left panel's top edge 24 while the top panel's right edge 48 meets with the right panel's top edge 34 such that the height of the shade 10 is not at all extended. This seventh configuration is shown in FIGS. 14 through 19.

Alternatively, the first side extender 50 and second side extender 60 can be attached to the left side panel 20 and right side panel 30, respectively, so that the first side extender 50 and second side extender 60 overlap less than they do in the seventh configuration. In this eighth configuration, shown in FIGS. 20 through 27, the top panel raises in height as it extends away from the back panel 12. In this way, a greater field of vision is provided to the electronic device 2 within the shade 10. Preferably, the shade 10's height may be adjusted upwards up to approximately eight or nine inches as compared to the seventh configuration.

Figure 26:
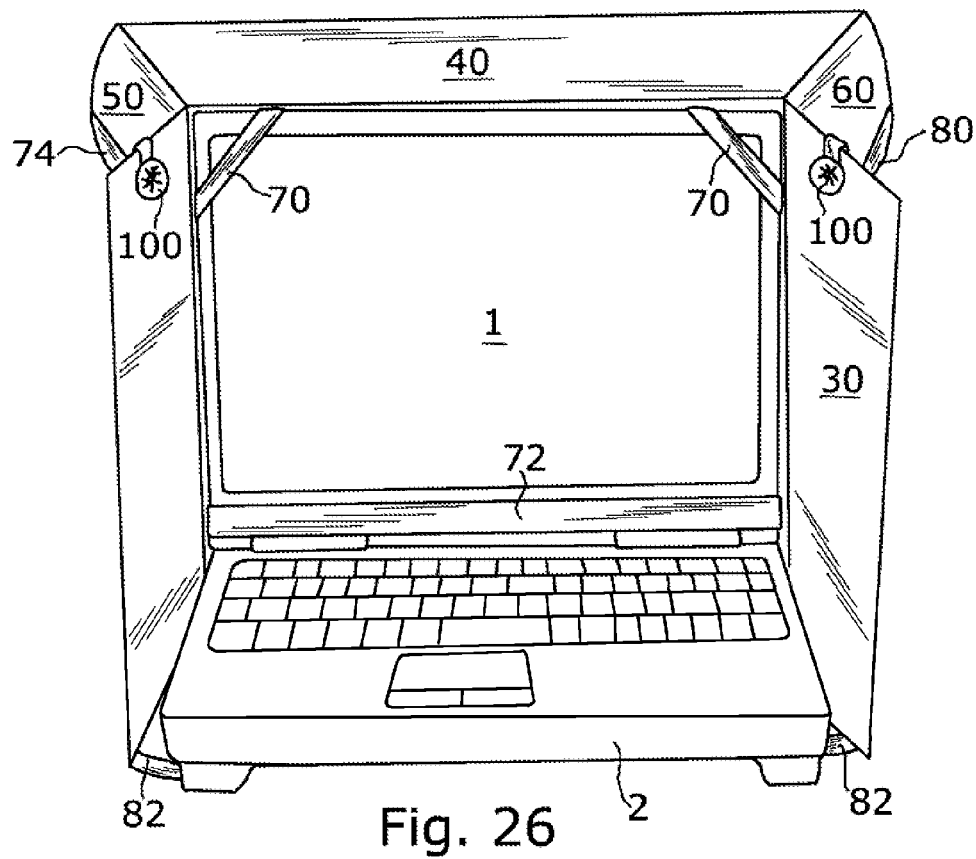
FIG. 26 is a front side, perspective view of a sun-blocking hood in the eighth configuration, i.e., fully constructed with height extension, attached to an open electronic device, according to a fourth embodiment.
Figure 27:
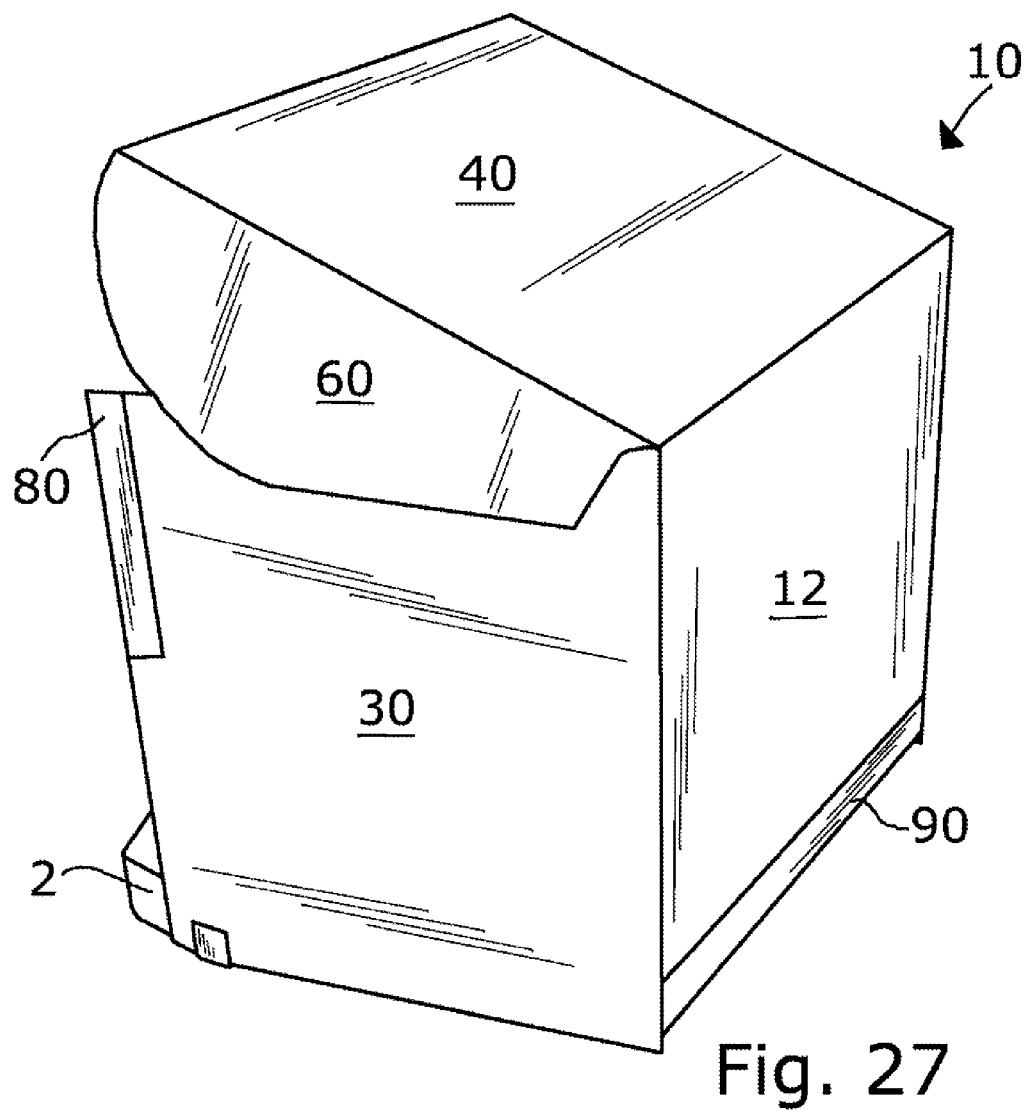
FIG. 27 is a right and back sides, perspective view of a sun-blocking hood in the eighth configuration, i.e., fully constructed with height extension, attached to an open electronic device, according to the fourth embodiment.

As shown in FIGS. 26 and 27, according to a fourth embodiment, the shade 10 is alternatively embodied with curved-ended first and second side extenders 50, 60 so that when the first and second side extenders 50, 60 are raised, no portion of the first or second side extender 50, 60 will protrude past the left panel's front edge 26 or the right panel's front edge 36.

The shade 10 is further preferably fitted with a bottom attachment mechanism 82 that is configured to accommodate securing of the left panel 20 and the right panel 30 in place, relative to one another, when the shade 10 is fully constructed. Preferably, the bottom attachment mechanism 82 comprises a hook and loop system in which a strap having either the hook or loop side on its end is attached to one of the left and right panels 20, 30 with the corresponding loop or hook side being attached to the other of the left and right panel 20, 30. As shown in the figures, and particularly in 14 through 20, the bottom attachment mechanism 82 first includes a strap attached to the right panel 30 in an area near the right panel's bottom edge 38 and front edge 36. The strap includes either a hook or loop portion on the end thereof. The bottom attachment mechanism 82 further includes the corresponding loop or hook portion, as the case may be, attached to the left panel 20 in an area near the left panel's bottom edge 28 and front edge 26. Accordingly, the strap may be passed from the right side 5 of the electronic device 2, under the bottom 8 of the electronic device 2, and connected to the panel 20 on the left side 6 of the electronic device 2. In this way, the shade 10 is less likely to accidentally fall away from the electronic device 2, which may be particularly a risk if the upper attachment mechanism 70 and lower attachment mechanism 72 are not in use.

Finally, as shown in FIG. 26, according to a fourth embodiment, the shade 10 includes a pair of lights 100 that are configured to be attached to a panel, preferably the right panel 30 or left panel 20 at the right panel's top edge 34 or at the left panel's top edge 24. In other embodiments, the lights 100 may be clipped to the upper or lower attachment mechanisms 70, 72, to the back panel 12, or the top panel 40. In still other embodiments, the light 100 may be integrated with one of the panels 12, 20, 30, 40 or may be affixable to one of the panels 12, 20, 30, 40 such as via a hoop and loop mechanism, a snap, a button, or an adhesive, whether permanent or non-permanent. In any regard, the lights 100 are configured to accommodate lighting of the display 2 or the electronic device's 2 other features without undesirable glare. Preferably, the light 100 is either battery powered or includes a cord to accommodate powering the light via a port on the electronic device, such as a USB port.

In still other embodiments, the hood 10 includes a bottom panel that is attached to any of the left panel 20, right panel 30, and back panel 12. Preferably, such bottom panel is comprised of a mesh-like material, so as to allow for air circulation to the electronic device's bottom 8. In certain of these embodiments, the bottom panel includes a cooling device, such as a fan, that is configured to aid in the air circulation. Such fan is ideally configured to be powered via connection of the same to a port on the electronic device, such as another USB port. In still more particular of these embodiments, the lights 100 and the cooling device are configured to be powered together by utilizing only one of the ports on the electronic device 2 for the powering.

Further embodiments include an elevating feature on the bottom of the shade 10. The elevating feature is designed to assist in elevating, or tilting, the electronic device 2 off the surface on which the shade 10 rests, so as to allow for increased air circulation to the electronic device's bottom 8 and to allow the user to have more flexibility in the manner in which the electronic device 2 is used.

Still further embodiments, particularly those embodiments in which the top panel 40 and the back panel 12 are configured to join to one another and to completely enclose the electronic device 2 when the shade 10 is in the fully collapsed configuration and when the electronic device 2 is in a closed position, include carrying features to assist in carrying the sleeve or case formed by the enclosed shade 10. Such carrying features include a single handle, a plurality of handles, a shoulder strap, a pair of back straps so that the shade may be worn in the form of a backpack while the electronic device is enclosed within, a waist strap, or any other conventional means of carrying an electronic device contained within a case. Such a shade 10 that includes the features of the lights 100, the cooling device, and the elevating feature, is an all-in-one device with privacy panels, shading panels, lights for the keyboard or display, cooling features, elevating features, carrying case, and protective sleeve.

Figure 28:
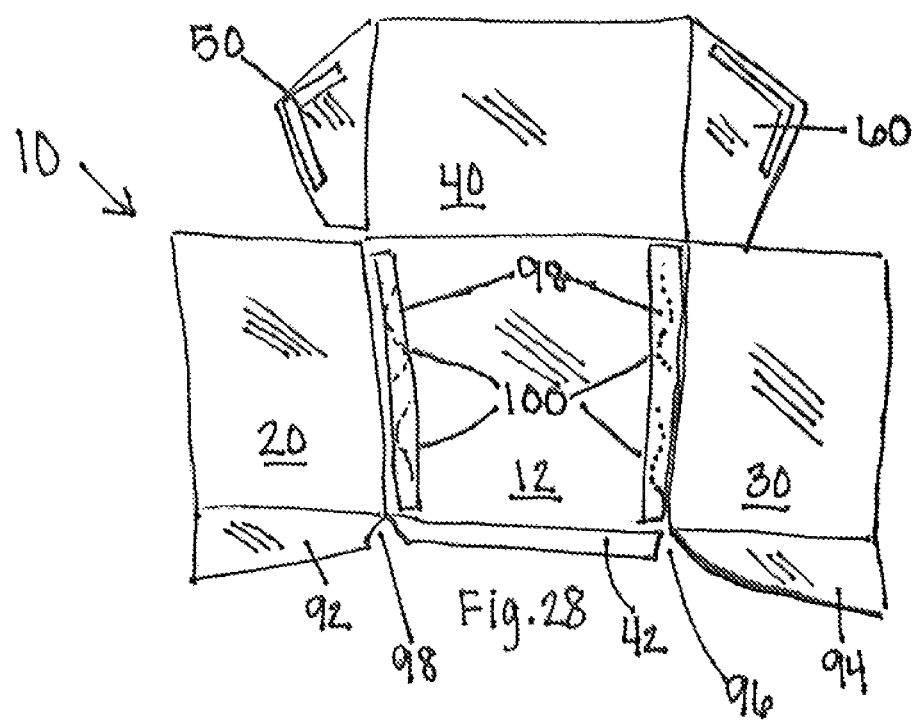
FIG. 28 is a view of a flattened device facing side of an embodiment of the sun-blocking hood with side bottom flaps and u shaped guide channels.
Figure 29:
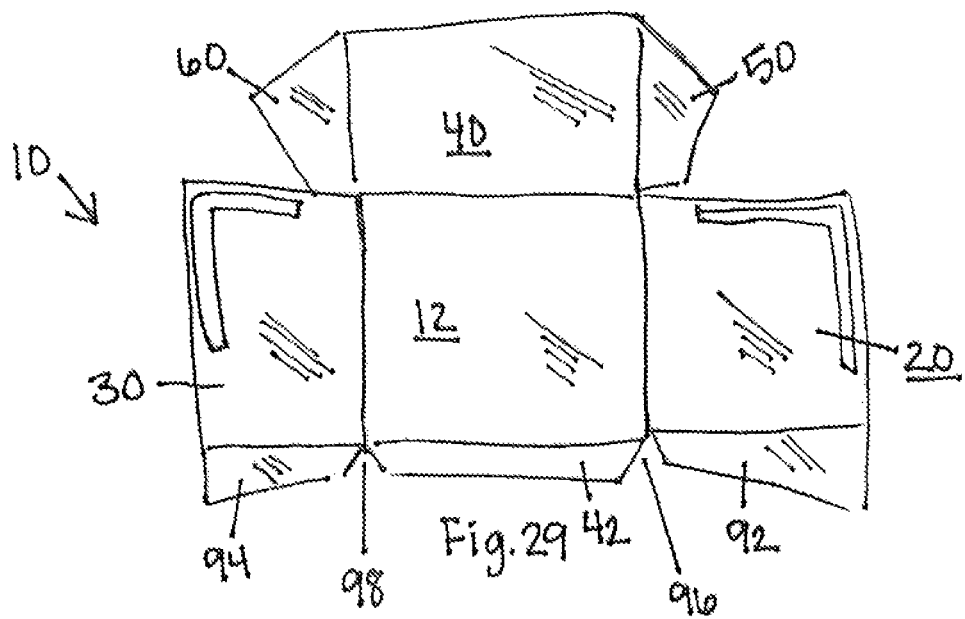
FIG. 29 is a view of a flattened back side of an embodiment of the sun-blocking hood with side bottom flaps and u shaped guide channels.
Figure 30:
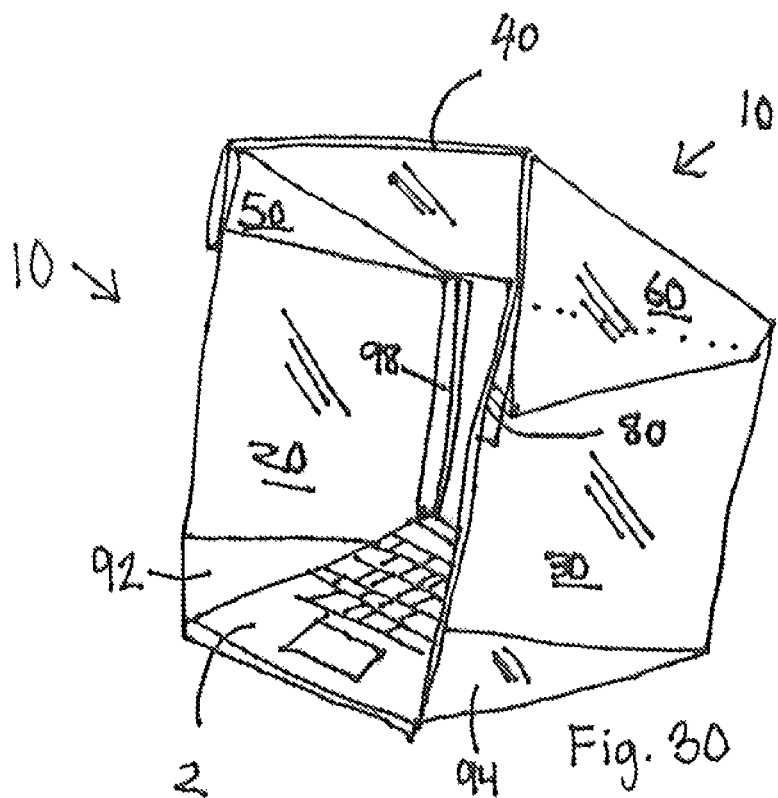
FIG. 30 is a perspective view of an embodiment of the sun-blocking hood with side bottom flaps and u shaped guide channels.
Figure 31:
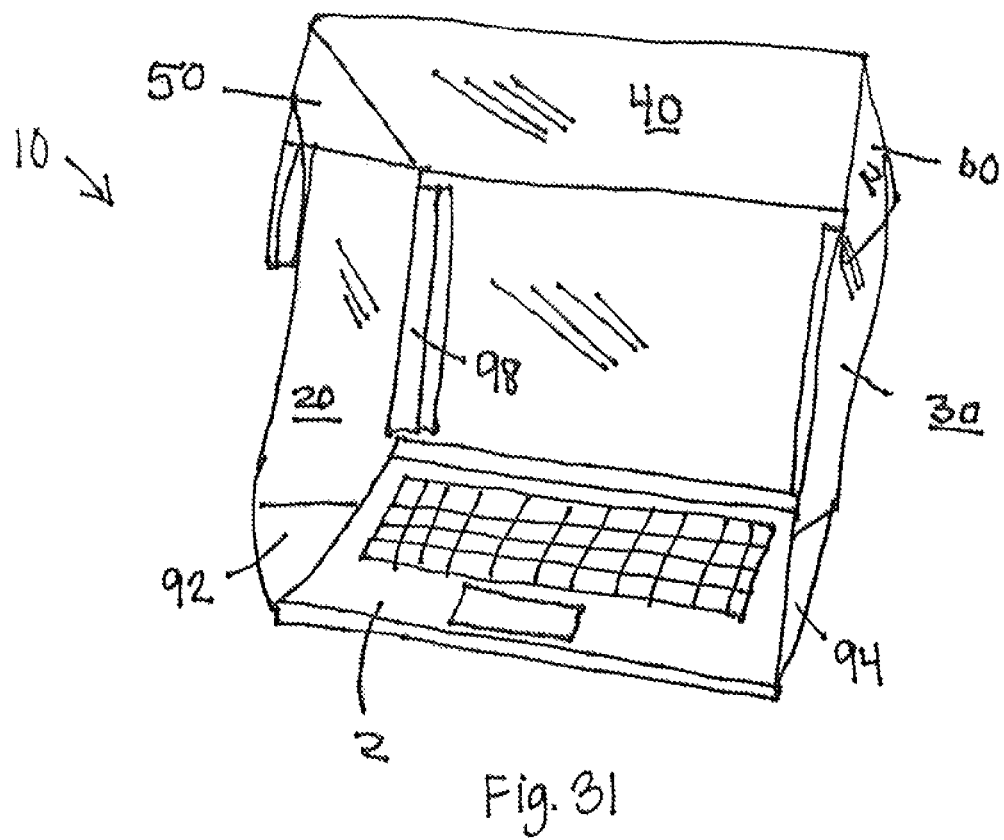
FIG. 31 is a perspective view of an embodiment of the sun-blocking hood with side bottom flaps and u shaped guide channels.

FIGS. 28-31 show an embodiment of the device which includes left and right bottom flaps 92 and 94. These panels are attached to left and right panels 20 and 30, respectively. Between the left and right bottom flaps 92 and 94 is the top panel back edge 42, which is separated from the bottom flaps 92 and 94 by v shaped notches 96. This allows the back edge 42 to be easily lifted to allow access to ports on the back side of the computer 2. In FIG. 28 is shown the u shaped guide channels 98, which can be made of semi rigid plastic or other suitable material. Inside the guide channels 98 are spring strips 100, which allow the guide channels to securely fit onto the side edges of electronic devices such as laptop computers. The u shaped guide channels 98 are positioned with the open side facing into the interior of back panel 12, to allow a computer to be slid into the guide channels 98. FIGS. 30 and 31 show the device of FIGS. 28 and 29 assembled around an electronic device.

The bottom flaps 92 and 94 allow the sides and top of the shade to be rotated to the rear, opening up a better view into the computer screen, while maintaining a light blockage from the side.

While there is shown and described the present preferred embodiment of the sun-blocking hood, it is to be distinctly understood that this invention is not limited thereto but may be variously embodied to practice within the scope of the following claims. From the foregoing description, it will be apparent that various changes may be made without departing from the spirit and scope of the invention as defined by the following claims.

What is claimed is:

1. A shade for an electronic device, said electronic device having a display, a back, a left side, a right side, and a bottom, said shade comprising
    a back panel having a back panel left edge, a back panel top edge, a back panel right edge, and a back panel bottom edge, with said back panel attachable to a display containing portion of said electronic device;
    a left panel having a left panel back edge, a left panel top edge, a left panel front edge, and a left panel bottom edge, said left panel back edge being connected to said back panel left edge, and with said left panel sized to extend to the bottom edge of said electronic device, and thus block all side entering light and glare from reaching said device;
    a right panel having a right panel back edge, a right panel top edge, a right panel front edge, and a right panel bottom edge, said right panel back edge being connected to said back panel right edge, and with said right panel sized to extend to the bottom edge of said electronic device, and thus block all side entering light and glare from reaching said device;
    a top panel having a top panel back edge, a top panel left edge, a top panel right edge, and a top panel front edge, said top panel back edge being connected to said back panel top edge;
    said left panel having a generally wedge shaped polygonal left bottom flap as wide as said left panel, said wedge shaped left bottom flap attached to said left panel bottom edge and extending leftward away from said electronic device, said wedge shaped left bottom flap configured for placement alongside said electronic device left side to allow upward rotation of said left panel and top panel while still blocking light from entering the interior of said shade;
    said right panel having a generally wedge shaped polygonal right bottom flap as wide as said right panel, said wedge shaped right bottom flap attached to said right panel bottom edge and extending rightward away from said electronic device, said wedge shaped right bottom flap configured for placement alongside said electronic device right side to allow upward rotation of said right panel and top panel while still blocking light from entering the interior of said shade;
    a first side extender, said first side extender having a first side extender top edge, said first side extender top edge being connected to said top panel left edge;
    a second side extender, said second side extender having a second side extender top edge, said second side extender top edge being connected to said top panel right edge;
    at least one left attachment mechanism connected to said left panel, said left attachment mechanisms being configured to selectively hold onto a portion of said first side extender; and
    at least one right attachment mechanism connected to said right panel, said right attachment mechanisms being configured to selectively hold onto a portion of said second side extender;
    a left u shaped guide channel and a right u shaped guide channel, attached to said back panel adjacent the left and right edges of said back panel, positioned with the open side of the U channel facing the center of the back panel, and configured for engagement with side edges of said electronic device;
    whereby said shade may be removably attached to said display containing portion of an electronic device via said left and right u shaped guide channels, such that said back panel lays against said electronic device's back, and said shade being further configured so that said shade may be arranged in at least one collapsed position while said shade is attached to said back side of said electronic device's back, and said left panel extends along said electronic device's left side from said back panel, said right panel extends along said electronic device's right side from said back panel, said top panel extends from said back panel and over said display, said first side extender overlaps said left panel top edge and at least partially overlaps a portion of left panel such that said first side extender is selectively attached to said left panel via at least one of said left attachment mechanisms, and said second side extender overlaps said right panel top edge and at least partially overlaps a portion of said right panel such that said second side extender is selectively attached to said right panel via at least one of said right attachment mechanisms, such that said shade will essentially block light from shining on said display from behind or beside said electronic device; and
    whereby said first side extender may be selectively attached to said left panel via at least one of said left attachment mechanisms and said second side extender may be selectively attached to said right panel via at least one of said right attachment mechanisms such that said top panel's height may be selectively adjusted.

2. The shade of claim 1 in which the said back panel has a bottom edge which is separated from said left and right bottom flaps by v notches, which allows said back panel bottom edge fold up for easy access to electronic ports on the back of said electronic device.

3. The shade of claim 1, further comprising: a bottom attachment mechanism in the form of a strap configured to selectively connect to said left panel and to said right panel and configured to pass underneath said electronic device's bottom;
    whereby when said bottom attachment mechanism is selectively connected to said left panel and to said right panel, said left panel and said right panel will not freely move away from one another.

4. The shade of claim 1, further comprising: a left hinge connected to said back panel left edge and to said left panel back edge, such that said left panel is hingedly connected to said back panel;
    a right hinge connected to said back panel right edge and to said right panel back edge, such that said right panel is hingedly connected to said back panel;
    and a top hinge connected to said back panel top edge and to said top panel back edge, such that said top panel is hingedly connected to said back panel;
    whereby said left panel may be selectively moved from laying on top of said back panel to laying beside said back panel and to laying in back of said back panel;

whereby said right panel may be selectively moved from laying on top of said back panel to laying beside said back panel and to laying in back of said back panel;

whereby said top panel may be selectively moved from laying on top of said back panel to laying beside said back panel and to laying in back of said back panel;

and whereby said shade may be arranged in at least one collapsed position.

5. The shade of claim 4, further comprising: a top left hinge connected to said top panel left edge and to said first side extender, such that said first side extender is hingedly connected to said top panel;

and a top right hinge connected to said top panel right edge and to said second side extender, such that said second side extender is hingedly connected to said top panel;

whereby said first side extender may be selectively moved from laying on top of said top panel to laying beside said top panel and to laying in back of said top panel;

whereby said second side extender may be selectively moved from laying on top of said top panel to laying beside said top panel and to laying in back of said top panel;

and whereby said shade may be arranged in a first collapsed position in which said first side extender lays on top of said top panel and said second side extender lays on top of said top panel, while said top panel lays behind said back panel such that said first side extender lays behind said back panel and said second side extender lays behind said back panel, while said left panel lays behind said back panel such that it lays next to said top panel, and while said right panel lays behind said back panel such that it lays next to said left panel.

6. The shade of claim 5 further comprising a plurality of edge attachment mechanisms, each connected to each of said top panel back edge, said top panel front edge, and said back panel bottom edge, said edge attachment mechanisms configured to be selectively attached to another of said edge attachment mechanisms when said shade is arranged in said first collapsed position.

7. The shade of claim 4 wherein each of said left hinge, right hinge, and top hinge, are made of fabric.

8. The shade of claim 1, wherein said electronic device is a laptop computer.

9. The shade of claim 1 further comprising at least one light configured to accommodate lighting of portions of said electronic device.

10. The shade of claim 9, wherein said lights are each configured to removably attached to one of said back panel, left panel, right panel, and top panel.

11. The shade of claim 9, wherein said lights are each configured to attach to one of said back panel, left panel, right panel, and top panel.

12. The shade of claim 9, wherein said lights are powered by said electronic device.

13. The shade of claim 9, wherein said lights are battery powered.

* * * * *